UNITED STATES PATENT OFFICE.

LOUIS NAUMANN AND CARL POHL, OF PLASSEN, NEAR DRESDEN, GERMANY.

TREATMENT OF HOPS FOR PRESERVATION.

SPECIFICATION forming part of Letters Patent No. 223,602, dated January 13, 1880.

Application filed July 5, 1879.

*To all whom it may concern:*

Be it known that we, LOUIS NAUMANN and CARL POHL, both of Plassen, near Dresden, in the German Empire, have invented an Improved Treatment of Hops for the Preservation thereof; and we do hereby declare that the following description forms a full and exact specification of the same, wherein we have set forth the nature and principles of our said improvement, by which our invention may be distinguished from others of a similar class, together with such parts as we claim and desire to secure by Letters Patent—that is to say:

It has long been desired to find an effectual mode of preserving hops, in order, principally, to have a constant supply of uniform quality throughout the year and to equalize the supplies for years of bad harvest. Various methods have been proposed for their preservation, all of which, however, are more or less imperfect or objectionable. Thus in the compression of hops in bales or in cases lined with metal, the former do not protect the hops sufficiently against the action of the air or moisture, while the latter burst frequently, not being sufficiently strong to withstand the pressure. The sulphurizing process protects the hops only for a short time, while the extract of hops, on the other hand, has not met with general application—first, because in its manufacture the hops are not so economically utilized as when fresh hops are used, and, secondly, because the proper proportion between the aroma and the bitter principle cannot readily be maintained therein.

The compression of the hops in metal boxes, which are afterward closed hermetically, was a considerable improvement, as an effectual preservation was thereby attained for a certain length of time; but it has been proved that hops so treated are also liable to the same deterioration as compressed hops in bales if stored in the ordinary hop store-houses for a considerable length of time.

Our present invention has for its object a method of preserving the hops which, besides effectually maintaining the good quality of the hops, shall, first, be capable of practical application in every brewery and at a very moderate cost, and, secondly, shall be such that the hops so treated shall be applicable in the same manner as ordinary hops in the usual brewing process.

Our invention consists simply in treating the hops with alcohol, for which purpose they are sprinkled therewith and well mixed by stirring or otherwise, after which they are compressed in any convenient manner into receptacles of suitable construction, which are then closed.

The sprinkling and mixing might be effected by special apparatus; but it is not necessary to perform this operation with very great care, as in the pressing the hops will be acted upon by the alcohol throughout with sufficient uniformity. For inclosing the hops, casks such as are readily available in breweries are employed by preference.

The mechanical operations are of so simple a nature that they do not require further description.

The very peculiar relation in which the alcohol stands to the aroma, the bitter principle, and the resinous matter produces the most favorable results in the brewing process carried out with hops treated according to our invention. Such preserved hops are boiled in precisely the same manner as fresh ones, during which process the alcohol naturally evaporates at once, without having the slightest detrimental effect upon the beer produced. On the contrary, the aroma is improved thereby.

No deterioration of such preserved hops takes place through any heating that may occur during storage, as the alcohol effectually prevents this, and consequently the hops may be stored in any localities which are used for storing ordinary hops.

As before stated, every brewery can carry out the treatment of hops according to our invention, as a treatment with sulphur, such as is necessary with every other existing process, is not required. No definite proportion of the alcohol to be used can be given, as this is entirely dependent on the quality of the hops to be used, and can only be determined by experiment.

Having thus described the nature of our invention and in what manner the same is to be performed, we claim—

As a new article of manufacture, hops moistened with alcohol and compressed into suitable receptacles, substantially as and for the purpose specified.

In testimony whereof we have signed our names to this specification in the presence of two subscribing witnesses this 9th day of June, 1879.

LOUIS NAUMANN.
CARL POHL.

Witnesses:
CARL SAMMERSCHUH,
CARL MAXIMILIAN HERRMANN.